(12) United States Patent
Jaworski et al.

(10) Patent No.: US 7,499,838 B2
(45) Date of Patent: Mar. 3, 2009

(54) METHOD AND SYSTEM FOR AUTOMATED CUSTOM DESIGN OF A STORAGE ASSEMBLY

(75) Inventors: John Jaworski, Morristown, NJ (US); William Burke, Basking Ridge, NJ (US); Opendra Nishan Madawala, Secaucus, NJ (US)

(73) Assignee: Contemporary Closet Classics, Millington, NJ (US)

( * ) Notice: Subject to any disclaimer, the term of this patent is extended or adjusted under 35 U.S.C. 154(b) by 478 days.

(21) Appl. No.: 10/922,445

(22) Filed: Aug. 19, 2004

(65) Prior Publication Data

US 2005/0043836 A1 Feb. 24, 2005

Related U.S. Application Data

(60) Provisional application No. 60/497,042, filed on Aug. 22, 2003.

(51) Int. Cl.
*G06F 17/50* (2006.01)
(52) U.S. Cl. ................................ 703/1; 703/6; 715/866
(58) Field of Classification Search ...................... 703/1, 703/7, 6; 705/27, 29; 700/97
See application file for complete search history.

(56) References Cited

U.S. PATENT DOCUMENTS

| | | | |
|---|---|---|---|
| 5,111,392 A | | 5/1992 | Malin |
| 5,255,207 A | * | 10/1993 | Cornwell ........................ 703/1 |
| 6,052,669 A | * | 4/2000 | Smith et al. .................... 705/26 |
| 6,389,322 B1 | * | 5/2002 | Park et al. ...................... 700/98 |
| 6,681,140 B1 | * | 1/2004 | Heil ............................. 700/95 |
| 6,813,610 B1 | * | 11/2004 | Bienias ......................... 705/27 |
| 6,968,298 B2 | * | 11/2005 | Lohmann et al. ................ 703/1 |
| 2002/0107673 A1 | | 8/2002 | Haller et al. |
| 2002/0107674 A1 | | 8/2002 | Bascle et al. |
| 2003/0009315 A1 | | 1/2003 | Thomas et al. |
| 2003/0208342 A1 | | 11/2003 | Jung |
| 2003/0233163 A1 | | 12/2003 | Dorsch |
| 2005/0021599 A1 | * | 1/2005 | Peters ......................... 709/203 |

FOREIGN PATENT DOCUMENTS

JP 03264244 11/1991

OTHER PUBLICATIONS

Mayk, Lauren. "Making Good Use of Space; Custom Closet Maker Builds to European Standards." Sarasota Herald Tribune. Mar. 28, 2003.*
Eng. lang. Abstract of JP03264244.

* cited by examiner

*Primary Examiner*—Paul L Rodriguez
*Assistant Examiner*—Jason Proctor
(74) *Attorney, Agent, or Firm*—Norris McLaughlin & Marcus

(57) ABSTRACT

A custom storage assembly design module automates design of a storage assembly by automatically generating a recommended layout based on a user defined storage location. The design module, which can be communicatively coupled to a remote communications device including a monitor, provides custom design options in view of the recommended layout for the storage assembly, and monitors the selection of custom design options to avoid violation of allowance rules for the defined storage location. The design module displays the storage assembly with currently selected custom design options and also associated pricing information throughout the design process.

21 Claims, 10 Drawing Sheets

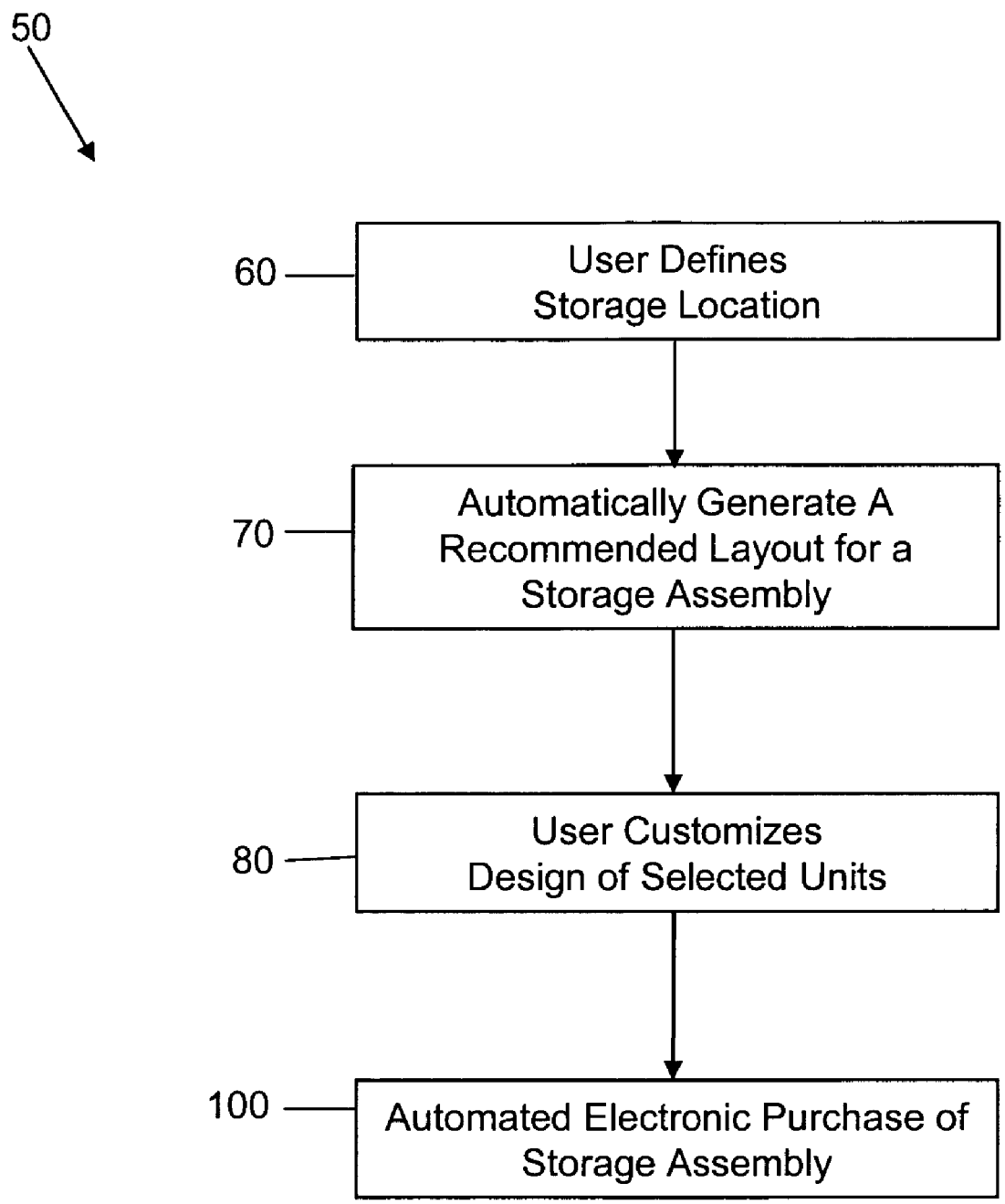

METHOD AND SYSTEM FOR AUTOMATED CUSTOM DESIGN OF A STORAGE ASSEMBLY

CROSS REFERENCE TO RELATED APPLICATION

This application claims the benefit of U.S. Provisional Application No. 60/497,042 filed Aug. 22, 2003, assigned to the assignee of this application and incorporated by reference herein.

FIELD OF THE INVENTION

The present invention relates generally to design of a storage assembly and, more particularly, to automated custom design of a storage assembly.

BACKGROUND OF THE INVENTION

The design of a storage assembly, such as a closet organizer for installation in a closet of a residential home, is usually a difficult and time consuming experience for an ordinary consumer. For example, to design a suitable and desired custom closet organizer, the consumer initially must accurately measure all of the walls of the closet in which the closet organizer is to be installed, identify potential storage elements that can be included in the closet organizer and then sort through and decide among the various storage elements and also potential configurations for the selected storage elements. Then, the consumer must decide which of the individual walls of the closet are to include particular storage elements or configurations of storage elements. The selection of storage elements is further complicated because the consumer must also consider the interconnection mechanisms of differently shaped and sized storage elements to ensure that the selected storage elements can physically be joined together according to rules for assembly of the storage assembly, while still fitting into the space in the closet available for installation of the storage elements.

Although some computer-based storage assembly custom design software applications are available, many of these applications do not provide an adequate level of assistance and checks on the practicability of desired, custom storage assembly design for the ordinary consumer who desires to design a custom storage assembly. First, a large majority of these applications are stand alone products that do not provide any or current pricing and do not have an appropriately intuitive interface for assisting the consumer in the design process. In addition, in some computer-based design software applications providing for online design capabilities, the consumer oftentimes can design the storage assembly using only the design capabilities that are available online, and then must subsequently make several modifications to the design offline. These offline modifications can be based upon, for example, an offline calculation of the cost of certain custom design options offered by a custom design storage assembly seller or manufacturer.

In addition, current software applications do not guide the consumer to design a custom storage assembly for a particular type of storage location using an initial proposed layout of storage elements that can be readily and easily installed in the storage location. The consumer attempting to custom design a storage assembly from scratch, therefore, is likely to quickly become frustrated and not proceed past the first step of developing an initial layout for a storage assembly from which further customization can be performed.

In addition, many applications do not link the selection of custom design options by a consumer to allowance rules for design of a storage assembly that are commonly known in the design industry. These allowance rules avoid design of a custom storage assembly that is non-functional, or an assembly that is impossible to install and does not fit into or optimally utilize available space within a storage location.

Therefore, a need exists for a system and method for designing a custom storage assembly that an ordinary consumer can easily use, that automates the process of designing a custom storage assembly in view of available space in a storage location, that utilizes the appropriate rules for designing storage assemblies that can be readily and correctly installed at a consumer's location and automatically calculates cost throughout the design process.

SUMMARY OF THE INVENTION

In accordance with the present invention, a custom storage assembly design module that is communicatively coupled to a computer terminal controls exchange of storage assembly design information between the terminal and the module so as to automate design of a custom storage assembly by a user operating the terminal. The design module generates graphic screen displays at the terminal that guide the user to define a storage location. Based on the user defined storage location, the design module automatically generates and displays a recommended layout for the storage assembly, and then displays custom design options that the user can select to customize the storage assembly for the storage location. The design module preferably monitors the selection of custom design options by the user to ensure that custom modifications to the storage assembly do not violate allowance rules for the storage location. The custom design of the storage assembly, in accordance with the allowance rules, maximizes use of available space in the storage location while ensuring that the user can install the custom storage assembly with relative ease in the storage location.

In a preferred embodiment, the user initially supplies storage location definition information to the design module. The design module then uses the definition information to compute usable space for the storage location in view of allowance rules specific to the type of storage location defined by the user. Based on the computed usable space, the design module automatically generates and displays a recommended layout for a storage assembly. The storage assembly includes at least one unit, each unit includes at least one section and each section includes at least one item. In addition, the design module displays custom design options that the user can select to customize items and sections within a unit of the storage assembly. As the user selects the design options, the design module automatically displays the customized storage assembly including the selected design options and also pricing information corresponding to the currently selected customized design of the storage assembly. At any time during the custom design process, the user can save information representative of the custom storage assembly to the design module for later retrieval and further customization of the storage assembly, or alternatively proceed directly to screen displays that provide for purchase and manufacture of the storage assembly and then shipping of the storage assembly to the user.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which:

FIG. 2 is a flow diagram illustrating a preferred process for automated custom storage assembly design in accordance with the present invention.

DETAILED DESCRIPTION OF THE INVENTION

For purposes of highlighting the features of the present invention, the inventive automated custom storage assembly design system and method are described below in connection with the design of a closet assembly for installation in a closet in a residential home. It is to be understood, however, that the automated custom storage assembly design system and method of the present invention can be applied to the design of a custom storage assembly for installation in any type of residential or commercial storage location, such as in a garage, kitchen, office, etc.

Figure 1:
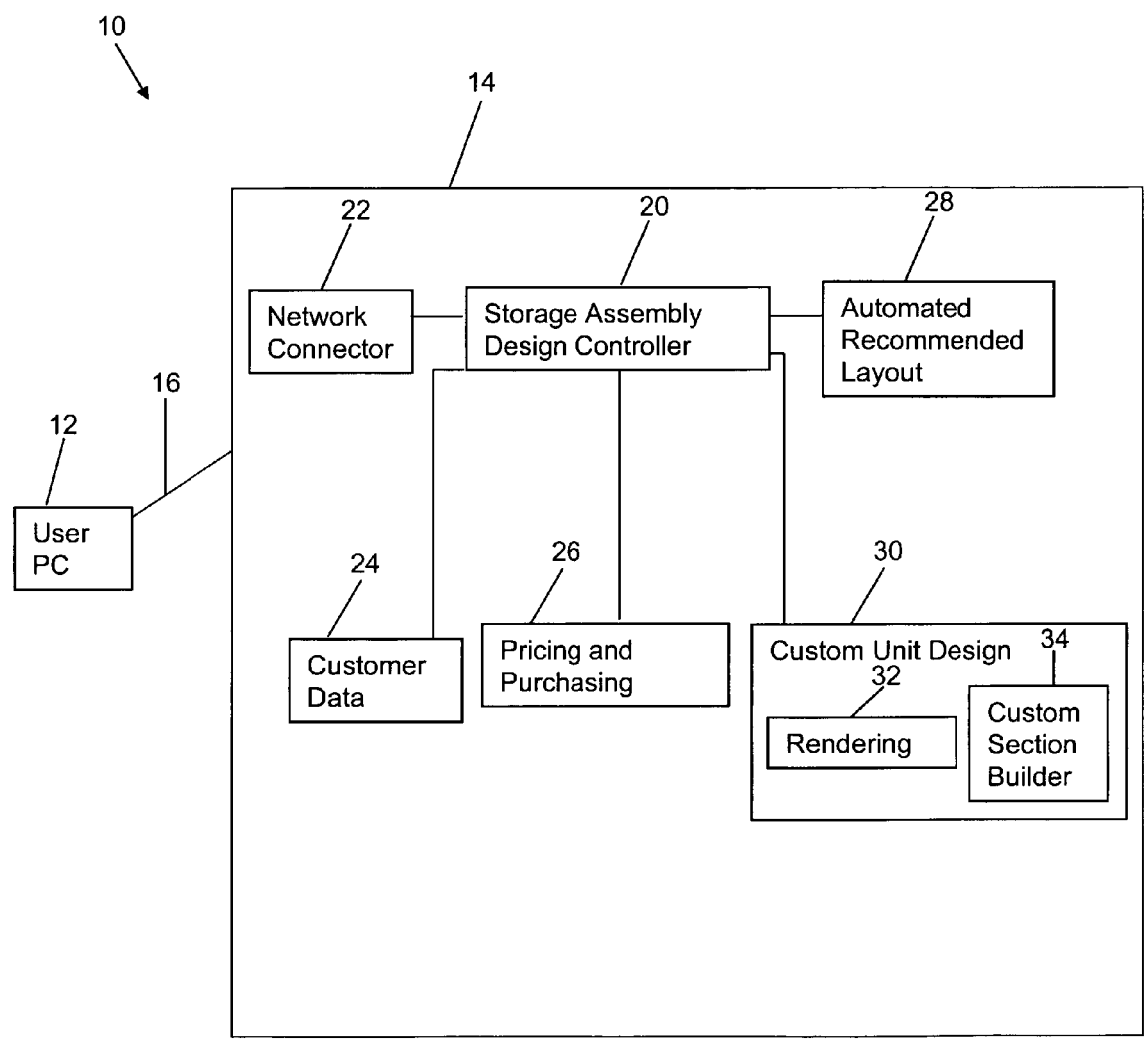
FIG. 1 is a functional block diagram of an automated custom storage assembly design system in accordance with the present invention.

FIG. 1 is a preferred embodiment of an automated custom storage assembly design system 10 in accordance with the present invention. Referring to FIG. 1, the system 10 includes a user terminal 12 that is communicatively coupled to an electronic design module 14 via a communications network 16. The user terminal 12 is a conventional computer, such as a stand alone personal or laptop computer including a monitor, mouse and keyboard, having communications capability and that a user can operate to establish a communications link with a remote communications device over a communications network, such as the Internet. The terminal 12 preferably is located remotely from the design module 14.

The network 16 is any conventional communications network, such as the Internet or any wired or wireless electronic network or an optical fiber network, that serves as a medium for establishing a communications link between two communication devices.

In accordance with the present invention, the design module 14 automates custom design of a storage assembly by controlling the exchange of storage assembly design information between the design module 14 and the user terminal 12. Graphic, computer generated screen displays that the design module 14 causes to appear at the monitor of the user terminal 12 facilitate the exchange of the storage assembly design information between the terminal 12 and the design module 14. The displays include interactive functionalities, such as selection icons and data input boxes, that provide for transmission of storage assembly design information between the module 14 and the terminal 12 over the network 16. Based on information defining a storage location entered by the user at the terminal 12, the design module 14 automatically generates and displays at the terminal 12 a recommended layout for a storage assembly for the defined storage location. In addition, the design module 14 displays at the terminal 12 custom design options that the user can select to customize any component of the storage assembly. The module 14 automatically updates the display of the storage assembly, in substantially real time, while the storage assembly undergoes customization so that the display shows the storage assembly including the custom design options currently selected by the user and also pricing information corresponding to the current, customized storage assembly.

The automated generation of a recommended layout for a storage assembly based on a defined storage location, and the automatic updating of the display to show the current, customized storage assembly and also corresponding pricing information, provides that a user can design, with great ease and minimal effort, a custom storage assembly from a location, such as the user's home, that is remote from a location containing the design module 14. For example, the design module 14 can be a centralized computer processing and network server system that can establish communication links with remotely located user terminals. The module 14 further can be included in, or communicatively coupled to, a facility containing computer controlled equipment for manufacturing a custom storage assembly. The manufacturing equipment preferably has the capability to directly use custom storage assembly information, which the module 14 generates to represent the custom storage assembly designed by a user, to manufacture the storage assembly. Advantageously, the design module 14 makes detailed information concerning the arrangement of individual storage components in the storage assembly undergoing custom design, and also pricing information for the storage assembly as customized by the custom design options selected by the user, always available for contemporaneous review by the user at the terminal 12 during the custom design process.

Referring again to FIG. 1, the design module 14 includes a storage assembly design controller 20 that is coupled to each of a network connector 22, a customer data module 24, a pricing and purchasing module 26, an automated recommended layout module 28 and a custom unit design module 30. The custom unit design module 30 further includes a rendering module 32 and a custom section builder module 34. It is to be understood that each of the modules in the design module 14 that is described below as performing data processing operations is a software module or, alternatively, a hardware module or a combined hardware/software module. In addition, each of the modules in the design module 14 suitably contains a memory storage area, such as RAM, for storage of data and instructions for performing processing operations in accordance with the present invention. Alternatively, instructions for performing processing operations can be stored in hardware in one or more of the modules of the design module 14.

The network connector 22 is any conventional device, such as a modem, that provides the design module 14 with the capability to exchange information over a communications network, such as the Internet.

The controller 20 interacts with the modules 22, 24, 26, 28 and 30 to effectuate the transfer of storage assembly design information, such as storage location definition information and custom design option selections, supplied at the user terminal 12 to one or more of the modules 24, 26, 28 and 30, as suitable. In addition, the controller 20 suitably routes data among or between the modules within the design module 14, as may be required, and causes storage assembly design information that one or more the modules 24, 26, 28 generates to be displayed at the user terminal 12. The storage assembly design information generated by a module of the design module 14 can include, for example, a recommended layout of a storage assembly, the storage assembly as modified by custom design options selected by the user and pricing for the storage assembly as modified by the selected custom design options.

For ease reference, the operations performed by the controller 20 to cause a graphic screen display to be generated at the user terminal 12, where the display includes storage assembly design information generated at one or more the modules included in the design module 14, is described below simply as the module of the design module 14 displaying the design information at the user terminal 12 as a screen display. In addition, for ease reference, the processing operations that the modules 24, 26, 28, 30, 32 and 34 perform to generate storage assembly design information are described below without identifying the conventional data routing operations that the controller 20 may need to perform to transfer data among or between the modules 24, 26, 28, 30, 32 and 34.

FIG. 2 illustrates a preferred flow process 50 for designing a custom storage assembly, in accordance with the present invention, based on the exchange of storage assembly design information between the terminal 12 and the design module 14 over the network 16. The process 50 automatically generates a recommended layout for a storage assembly based on a storage location definition supplied by the user at the terminal 12. The process 50 automatically modifies the storage assembly to achieve a custom storage assembly based on custom design options that the design module 14 displays at the terminal 12 and are selected by the user. In a preferred embodiment, the recommended layout for a storage assembly that a user initially selects for customization cannot be structurally modified by the user during customization to obtain a layout that violates design allowance rules for the defined storage location. The customization of the design of the storage assembly in accordance with the allowance rules avoids design of a storage assembly than cannot be easily installed and does not optimally use the available space within the storage location.

For ease of reference, a storage assembly is described herein in terms of items, sections and units. An item is a specific component used in the construction of a storage assembly. For example, where the storage assembly is a closet assembly, an item can constitute a shelf, closet rod, drawer or accessory. A section is a group of items positioned on one side of a vertical divider panel, or between adjacent vertical divider panels, that will be installed on a wall of a storage location. For example, a group of items in a closet assembly can constitute a tall hanging section, a double hanging section or a drawer section. A unit constitutes a single section or a group of sections of the storage assembly that extends along the same wall of the storage location.

For purposes of illustrating the present invention of automated design of a custom storage assembly, the process 50 is explained below in connection with the exchange of storage assembly design information between the user terminal 12 and the design module 14 of the system 10 to design a custom closet assembly. Referring to FIG. 2, in flow step 60 of the process 50, the user at the user terminal 12 supplies to the design module 14 over the network 16 the shape and measurement information needed to define the storage location of a closet in which a custom closet assembly, designed in accordance with the present invention, will be installed. For ease of reference herein, it is assumed that storage assembly design information supplied at the user terminal 12 is automatically transmitted to the module 14 over a communications link established on the network 16 using techniques that are conventional and well known in the art. In addition, it also assumed that the storage assembly design information generated at the module 14 for display at the user terminal 12 is automatically transmitted to the terminal 12 on the network 16 over the same communications link, also using techniques that are conventional and well known in the art. In flow step 60, the shape and measurement information preferably include wall angles and measurements of the heights and widths of walls that define the closet.

Based on the storage location definition information, the storage assembly controller 20 automatically generates and displays at the user terminal 12 a graphical representation of the walls and doorways of the closet that, preferably, is precisely to scale. In addition, the controller 20 stores the closet definition information in the customer data module 24. As discussed below in connection with flow step 70, the layout module 28 uses the closet definition information to compute how much space is available in the closet for installation of a custom closet assembly.

In a preferred embodiment of the flow step 60, the controller 20 displays at the user terminal 12 several predefined closet templates that represent the most common closet shapes that occur in the typical home. Based on the displayed predefined templates, the user at the terminal 12 selects the appropriate template and then supplies additional closet definition information, such as wall and angle measurements, as necessary. For example, referring to FIG. 3A, the controller 20 generates a screen display 60A at the user terminal 12 that includes a textbox 61 for entering a name of the closet to be designed. The screen display 60A also includes predefined templates 63A and 63B that are selection options and define general shapes of a closet location, such as a REACH-IN and BOX WALK-IN closet. In addition, the display 60A includes an IRREGULAR CLOSET template 63C as a selection option. In a preferred embodiment, the templates 63 include custom closet assembly images 62 showing an exemplary custom closet assembly with goods, such as shoes, pants, etc., arranged therein. The user selects the applicable shape template, such as the template BOX WALK-IN 63B, from the display to define the storage location simply by clicking on the SELECT icon associated with the template 63.

Figure 3A:
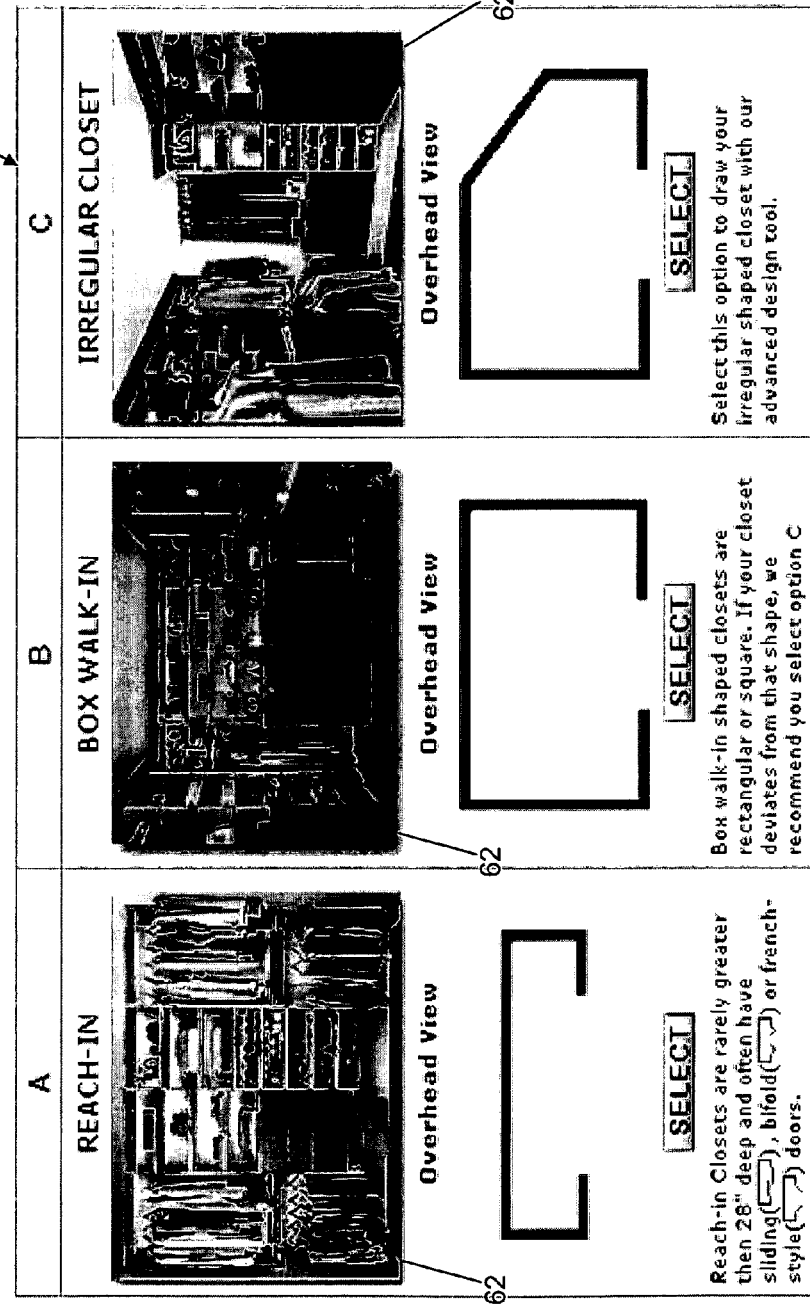
FIGS. 3A and 3B are graphic, computer generated screen displays that illustrate the automated definition of a storage location in accordance with the design process of FIG. 2.
Figure 3B:
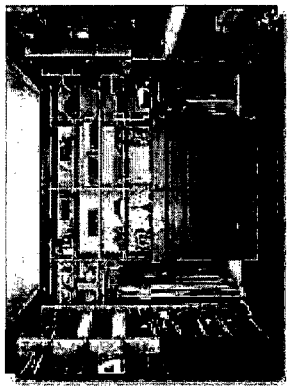

After the user selects one of the shape templates 63, the controller 20 displays a new screen display 60B, such as shown in FIG. 3B, at the user terminal 12. The display 60B shows the selected template 63B and also a measurement definition image 65. The definition image 65 includes data entry boxes 67 in which the user can enter width measurements for the individual walls 69A-69 that form the selected closet corresponding to the template 63B.

In an alternative preferred embodiment where the shape of a user closet does not match the predefined template options, the user can select the IRREGULAR CLOSET template 63C, as shown in FIG. 3A. Based on this selection, the controller 20 generates a blank grid screen display at the user terminal 12. The blank grid display includes conventional, computer aided drawing tools that permit the user to use a mouse to draw out the walls of an irregular closet. The controller 20 preferably provides that the irregular closet representation illustrated at the terminal 12 is drawn perfectly to scale.

In a preferred embodiment, the controller 20 is programmed with the following conventional, computer aided drawing features that the user can access to create an accurate, to scale graphical representation of the walls of an irregular closet with relative ease. A cross hair mouse control feature permits the user to draw, manipulate the angle of and assign a measurement in fractional inches to each wall of the closet. A snap feature rounds the wall angles drawn by the user to the nearest common angle, such as to 90, 45 or 180 degrees. A connect feature permits the user to easily connect walls by dragging a first wall within close proximity of a second wall to which the first wall is to be connected, without requiring that the first wall lay precisely on top of the second wall. The connect feature also provides that walls are connected at the appropriate angle. A wall front feature ensures that one side of a wall is always designated as the wall surface upon which components of a closet assembly will be installed, and that the opposite side of the wall is always designated as the back side of the wall and faces outside the closet, such as into bedrooms, bathrooms etc.

In a further preferred embodiment, the controller 20 includes an add text feature. The user can activate the text feature on the display at the user terminal 12 when the user desires to make special notations on the display, such as to describe any special attributes or features relating to the closet. The controller 20 suitably stores these notations with the closet definition information data in the customer data module 24.

After the necessary closet definition information is supplied in flow step 60, the automated layout module 28 in flow step 70 automatically generates a recommended layout for a closet assembly based on the closet definition information stored in the customer data module 24. The recommended layout is generated based on the results of a computation of the usable space available in the closet performed by the module 28. The usable space is defined as the length of wall space within the closet upon which custom closet assembly components can be installed. The computation of usable space within the closet is performed using algorithms that apply conventional storage assembly design principles, and also associated allowance rules that ensure clearances are maintained for the storage location for which a custom storage assembly is being designed. For example, in the custom design of a closet assembly, the layout module 28 applies allowance rules for a closet that ensure adequate clearances are maintained for connecting walls, doorways, unit depths and wall angles.

Figure 4:
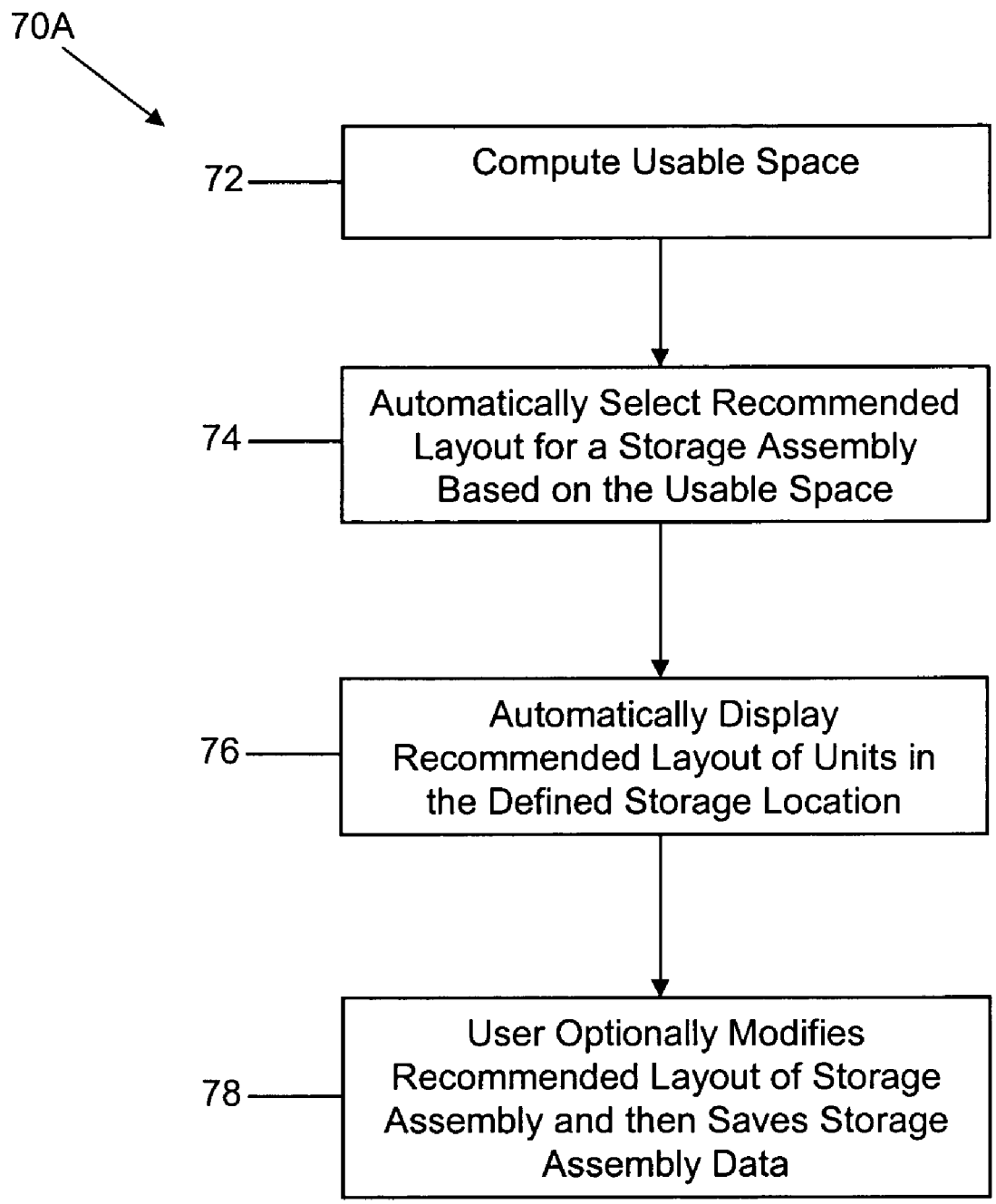
FIG. 4 is a flow diagram of a process for automatically generating a recommended layout of a storage assembly in accordance with the design process of FIG. 2.

In a preferred embodiment, the flow step 70 is executed by performing steps of a subprocess 70A, as shown in FIG. 4. Referring to FIG. 4, in step 72 of the subprocess 70A, the layout module 28 retrieves the closet definition information from the customer module 24 and computes, using conventional closet design principles and associated allowance rules for a closet, usable space for a closet assembly in the user defined closet. The complexity of the computation depends upon whether the closet is defined from a predefined template, such as the templates 63A or 63B, or is irregular in shape. The module 28, for example, computes usable space for each wall in a closet, allowing for clearances for connecting walls, doorways, unit depths and wall angles. The layout module 28 stores the computed usable space in the customer module 24 for use in future closet design steps.

Then in step 74, the layout module 28, based on the usable space and the closet definition data stored in the module 24, automatically generates a recommended layout for a closet assembly. The module 24 generates the recommended layout by selecting a layout from a storage assembly layout rules database that is contained in the module 28. The database includes typical storage assembly layouts indexed by storage location type, shape, size, usable space and other parameters, and prioritizes layout possibilities according to storage assembly layout rules also included in the database. The layout rules are the rules that professional storage assembly designers conventionally consider in the design of a storage assembly. The module 24 automatically sorts through various well known configurations of closet assemblies that are stored in the database, and selects a recommended layout whose parameters match those of the user defined closet. The module 24 utilizes conventional data processing techniques that are well known in the art to select a stored layout whose parameters match those of the user defined closet.

Figure 5:
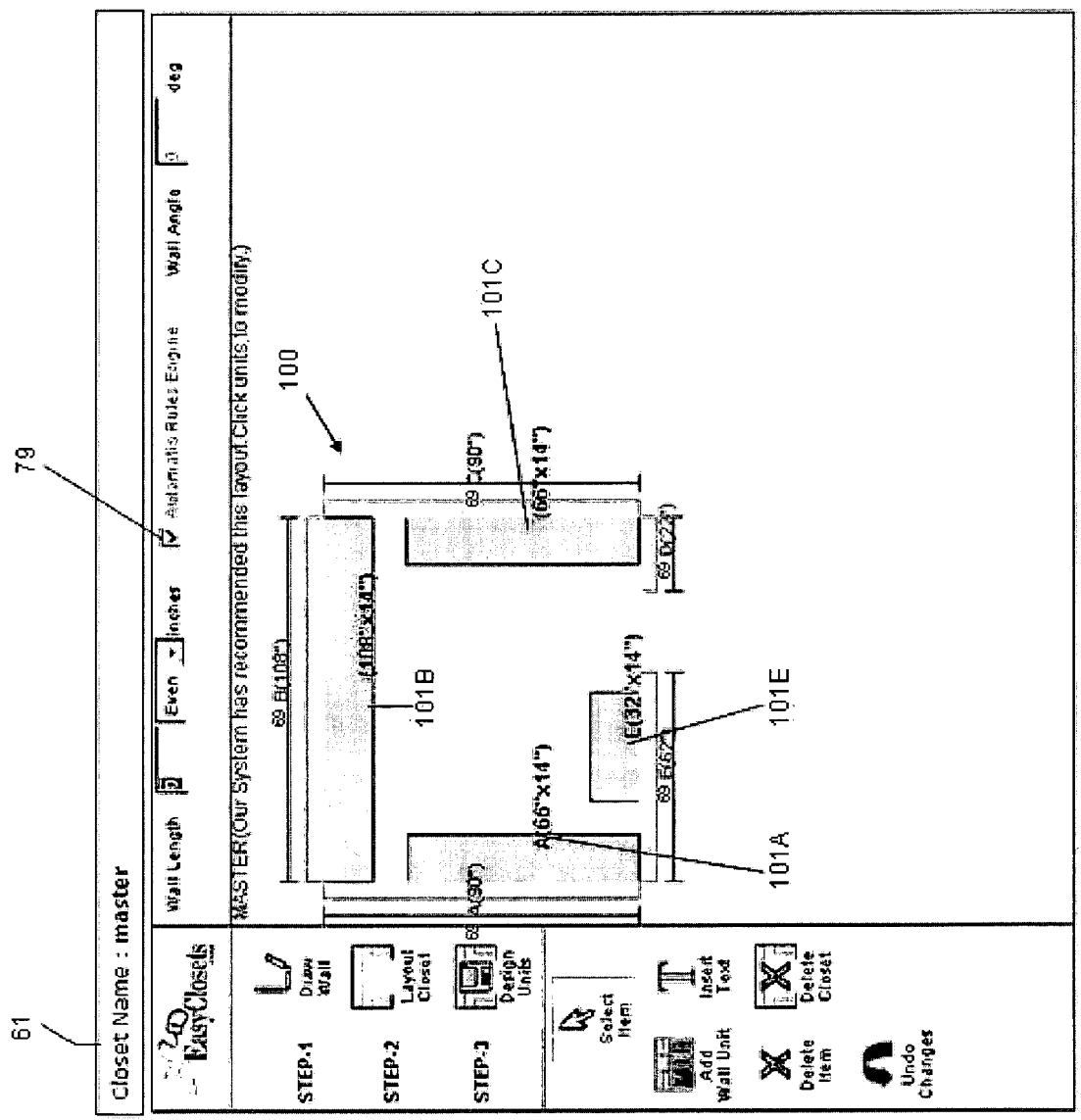
FIG. 5 is a graphic, computer generated screen display of an exemplary recommended layout of a storage assembly produced in accordance with the design process of FIG. 2.

In step 76, the module 28 automatically displays at the terminal 12 an overhead view of the recommended layout of the closet assembly as it would be installed in the user defined closet. For example, for the selected closet template illustrated in FIG. 3B, the layout module 28 in step 76 displays an exemplary recommended layout of a closet assembly 100, such as shown in FIG. 5. The closet assembly 100 includes units 101A, 101B, 101C and 101E in an arrangement that satisfies allowance rules for a closet as applied to the user defined closet. The allowance rules, for example, prevent overlap of adjoining units and assign priority to units having longer lengths, such as the unit 101B, than to adjoining units having shorter lengths, such as the units 101A and 101C.

In step 78, the user either saves the closet assembly with the recommended layout in the customer data module 24, or proceeds to modify the recommended layout before saving the closet assembly including the revised recommended layout in the module 24. Referring to FIG. 5, in a preferred embodiment, the layout module 28 provides that the user can modify the recommended layout 100 by clicking on a unit of the layout 100, such as the unit 101E. After the user selects the unit for modification, the layout module 28 permits the user to stretch or contract the selected unit 101E by manipulation of a mouse or other conventional drawing techniques. The layout module 28 monitors the unit modifications that the user supplies to prevent a modification of the recommended layout for the closet assembly that would violate the allowance rules for the user defined closet. In a default operating mode of the layout module 28, a user cannot modify any unit of the recommended layout into a form that would not fit into the user defined closet.

In an alternative preferred embodiment, the user, such as a professional closet designer, can override the allowance rules monitoring by the layout module 28 and generate an unconventional layout for the closet assembly. Referring to FIG. 5, the user can uncheck a user entry box 79, identified as automatic rules engine on the display, that indicates whether allowance rules monitoring by the module 28 is active or turned off.

After flow step 70 is completed, the user in flow step 80 selects custom design options to customize the design of one or more units within the closet assembly. The user initially selects a unit of the closet assembly for customization. Then, the custom unit design module 30 displays the selected unit at the terminal 12 showing all of its component elements in detail. For each of the sections within the selected unit, the custom unit design module 30 displays suggested custom design options and also input boxes for size modifications. The user suitably modifies the predefined closet sections within selected units of the closet assembly by selecting custom design options and entering size measurements in the input boxes for specific sections, as desired. The custom design options that the user can select for a section of the selected unit are constrained by the sizes of the units defined in the recommended layout for the closet assembly saved in flow step 70. In the preferred illustrated embodiment, the user manipulates the size and selection options for each closet section of a selected unit by selecting different menu and size selections displayed at the terminal 12.

Figure 6:
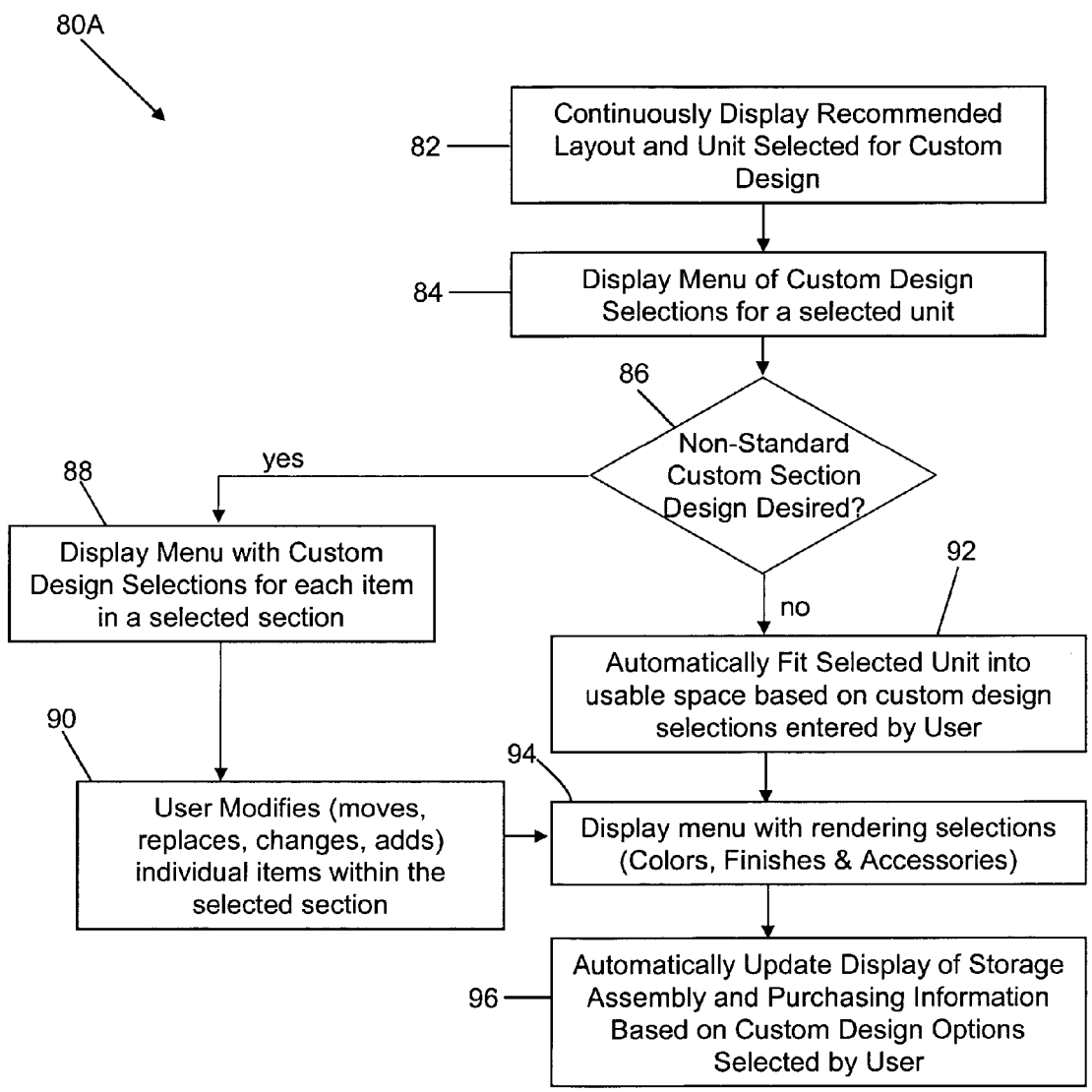
FIG. 6 is a flow diagram of a process for customizing the design of a selected unit of a storage assembly produced in accordance with the design process of FIG. 2.

In a preferred embodiment, the flow step 80 is performed by executing steps of a subprocess 80A, as illustrated in FIG. 6. Referring to FIG. 6, in step 82 the custom unit design module 30 continuously displays at the user terminal 12 a unit that the user selects to undergo custom design and also a miniature overview of the overhead layout saved in step 78. The overhead layout overview is included in the display to orient the user with the overall configuration of the closet assembly to ensure that the appropriate sections are placed in the desired areas of the closet. In addition, in a preferred embodiment, the custom design module 30 provides that the user can switch among units of the closet assembly, which are shown at the bottom of a screen display, so that the user can design all of the units in the closet assembly from the same screen display.

Figure 7:
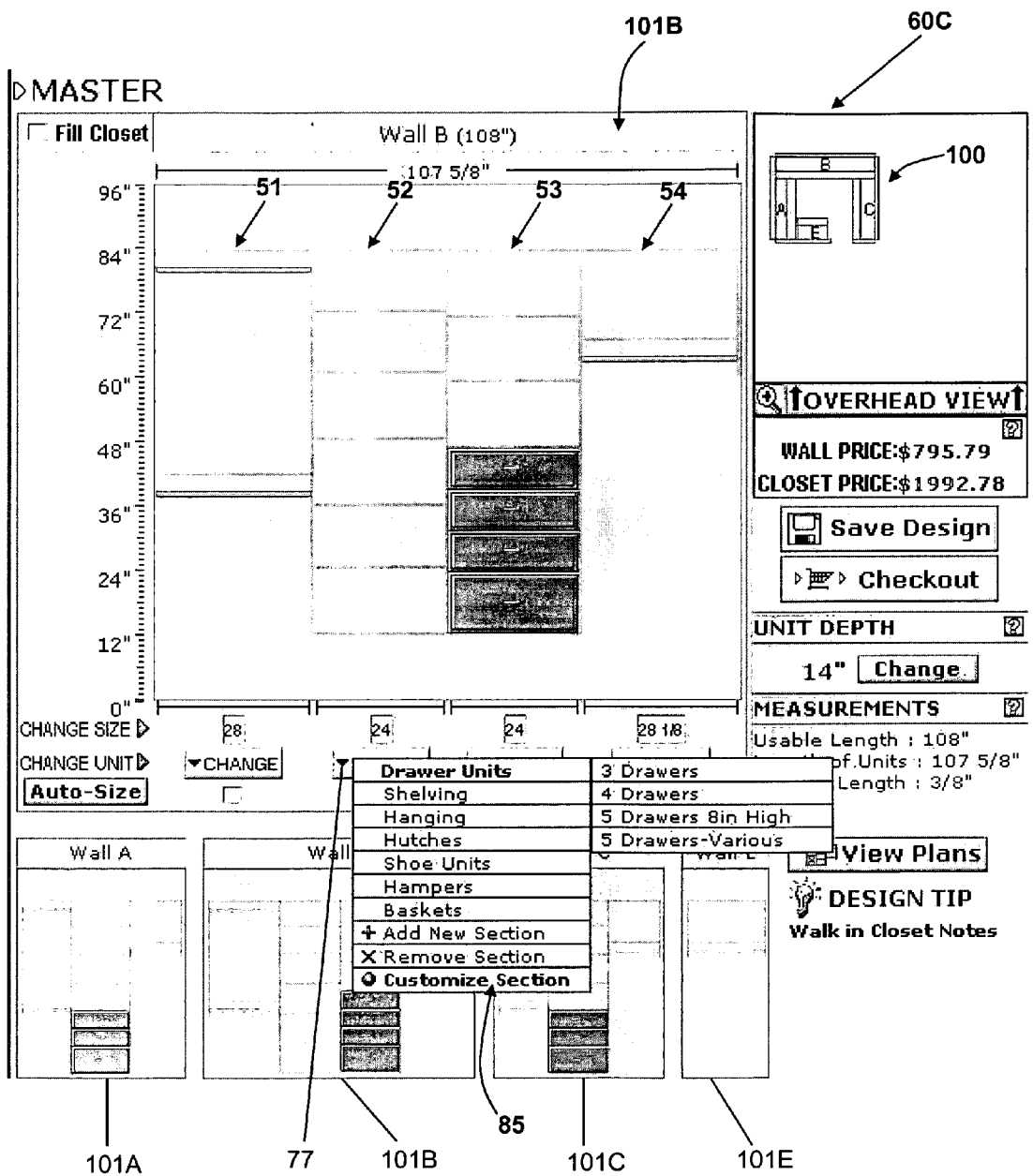
FIG. 7 is a graphic, computer generated screen display of a selected unit of a storage assembly undergoing automated custom design in accordance with the process of FIG. 6.

Continuing with the exemplary custom design of the closet assembly 100 having the layout as shown FIG. 5, in step 82 the custom unit design module 30 displays an exemplary screen display 60C, as shown in FIG. 7, at the terminal 12. The display 60C shows an enlarged unit 101B of the closet assembly 100 as the unit selected for custom design by the user, a miniature overview of the saved recommended layout 100 and reduced images of all of the units 101A, 101B, 101C, and 101E. The selected unit 101B includes closet sections S1, S2, S3 and S4.

In step 84, when the user clicks on a CHANGE icon 77 on the display 60C for the section S1, the custom design module 30 displays a menu 85 of custom design options for the selected unit 101B. The menu 85 includes drop down selections that allow the user to choose from a variety of custom design options, such as number and type of drawers in a section. The custom unit design module 30 monitors the selection of options to ensure that the closet assembly continues to satisfy allowance rules that will provide for easy installation in the defined closet. For example, the custom design module 30 coordinates the menu selections with width options to permit the user to select only those widths that are available for a given section of the selected unit based on the saved recommended layout for the closet assembly. In a preferred embodiment, the custom design module 30 provides that the user can custom design a unit using fractional measurements, such as sixteenths of an inch, to ensure a custom fit for each unit within the closet.

Figure 8:
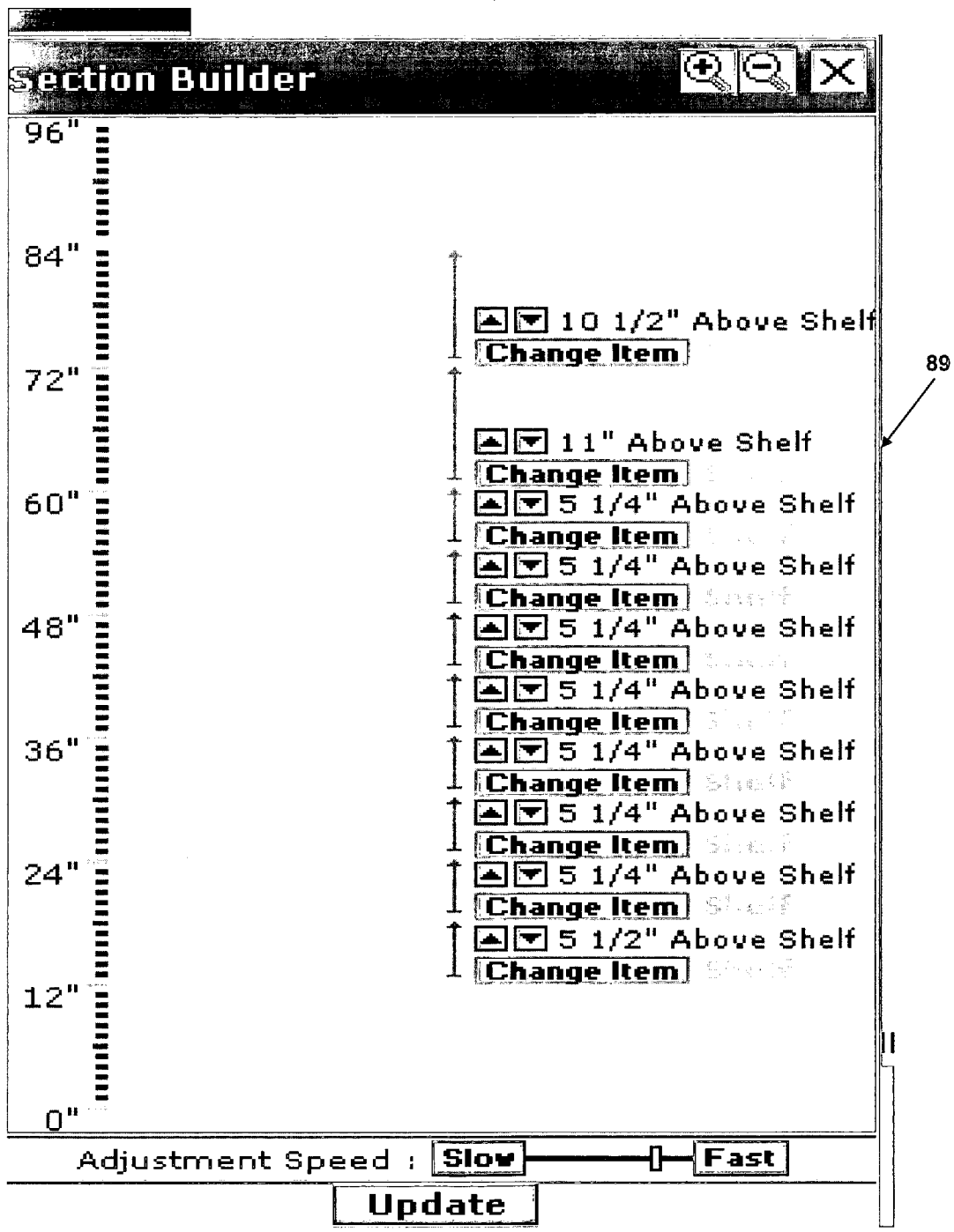
FIG. 8 is a graphic, computer generated screen display of a selected section of a storage assembly undergoing automated custom design in accordance with the process of FIG. 6.

In step 86, the custom design module 30 requests the user to indicate whether a non-standard custom design of a section is desired. If yes, the custom section builder module 34 in step 88 displays a menu with custom design options for each item in a selected section. The module 34 preferably display a screen display 89 including an enlarged image of the selected section with accompanying clickable dropdown menus adjacent to each item, as shown in FIG. 8. In step 90, the user manipulates these menus to move, replace, change or add items within the selected section. Accordingly, the user can configure a section into an unlimited number of combinations.

In a preferred embodiment, the module 34 monitors modifications entered by the user to ensure that selected design options for the selected section do not conflict with allowance rules for a closet. The allowance rules, for example, maintain a necessary spacing between each specific type of item within a section, and ensure that a section does not have a cumulative length equal to or exceeding the length of the unit within which the section is contained.

Further, the allowance rules preferably ensure that all units for the saved closet assembly will fit between the walls in the defined closet location, allowing for common inconsistencies, such as a wave in the wall, warping wood and walls installed out of square, sometimes found with sheetrock walls typically installed in a residence. For example, the custom unit design module 30 ensures that the design of a section of a unit has a cumulative length that is one-quarter to three quarters of an inch shorter than the overall length of the unit.

If a standard custom design of a section is indicated in step 86, the custom design module 30 performs step 92. In step 92, the module 30 processes the custom design options entered by the user to ensure that the user does not design a section that conflicts with the allowance rules for a closet, such as described above. In a addition, the custom design module 30 automatically calculates the available width in the unit selected for custom design and expands the sections in the selected unit to fit the available width.

After step 90 or 92 is completed, such that the user has selected custom design, width and size options for the sections of the storage assembly, the rendering module 32 in step 94 displays a menu showing available finishing and hardware options. Based on user selections, the rendering module 32 automatically changes the finishes and hardware for individual items within the closet assembly, without changing the structural features of the sections of the closet assembly. In a further preferred embodiment, the user can change the colors of the walls displayed behind the unit selected for rendering to provide a color scheme on the screen display at the terminal 12 that highlights the colors selected for the closet assembly.

Figure 9:
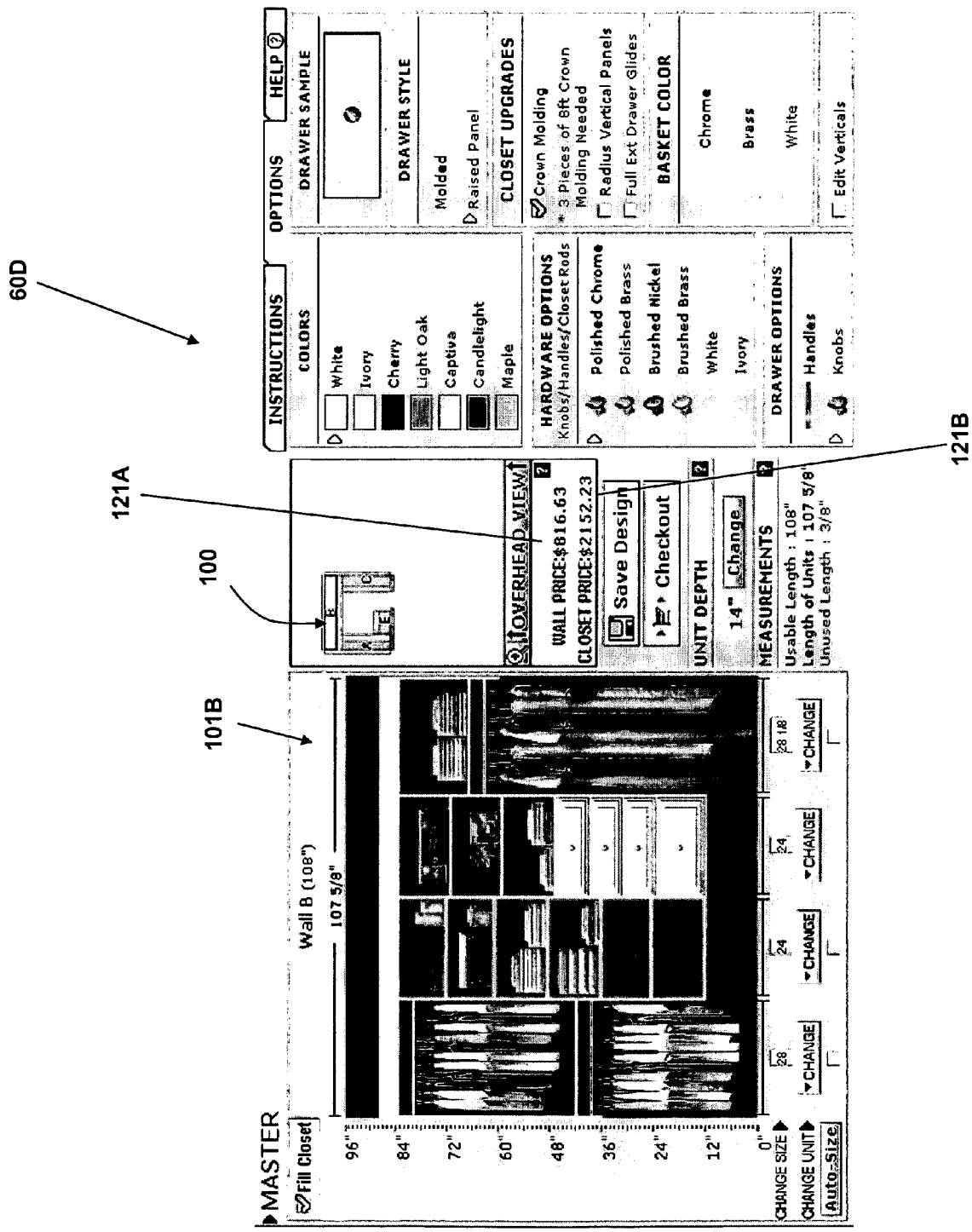
FIG. 9 is a graphic, computer generated screen display including rendering and purchasing information for a storage assembly undergoing automated custom design in accordance with the process of FIG. 6.

Following step 94, in step 96 the custom design module 30 automatically refreshes the screen display at the user terminal 12 based on the rendering options that the user selects, thereby providing that a closet assembly including the currently selected custom design options is always shown at the user terminal 12. In addition in step 96, the pricing and purchasing module 26 computes pricing information for each of the units of the closet assembly, based on the rendering and other custom design options selected by the user, and displays the pricing information at the terminal 12 together with the current custom closet assembly. For example, referring to FIG. 9, a screen display 60D at the user terminal 12 includes the rendering options selected for items of the selected unit 101B of the closet assembly 100, a price 121A for the unit 101B including the currently selected rendering options and a price 121B for the entire closet assembly 100. Advantageously, the communications link established between the user terminal 12 and the design module 14 ensures that the display includes current pricing for a selected unit undergoing rendering and also the entire closet assembly 100 including the custom design options selected.

Referring again to FIG. 2, after customization of the storage assembly is completed in flow step 80, the pricing and purchasing module 26 in step 100 displays at the user terminal 12 electronic purchase information for the closet assembly. As part of step 80, the user can save data representative of the storage assembly including the currently selected custom design options in the customer data module 24 for later retrieval and potential further modification. In addition, the user can supply payment information, such as a credit card number, and also shipping information. The purchasing module 26 then attends to completing the purchasing transaction and generating an electronic purchase order based on the storage assembly custom design information for the user stored in the customer data module 24. The purchase order preferably includes all of the specifications for the custom designed closet assembly. The specifications preferably can be used directly by automated storage assembly manufacturing machinery to manufacture all of the components of the custom design closet assembly components, to package the components with installation instructions that are automatically generated based on the custom design specification and then to provide for the shipping of the package to the user at the supplied shipping address.

In an alternative preferred embodiment, the module 14 or portions of the module 14 are embodied as software on a portable memory medium, such as a CD-ROM or like computer memory media, that the user can access at the terminal 12 and operate to perform some or all of the functions that the module 14 performs when the module 14 is contained at a location remote from the terminal 12.

In still another preferred embodiment, a remote module 14, based on storage definition information supplied by a user via an email message, transmits a recommended layout for a storage assembly to the user terminal 12 in the form of an email message. The message includes a hyperlink to the module 14 that permits the user to customize the storage assembly using at least some of the custom design options described above in connection with performance of the process 50.

Although preferred embodiments of the present invention have been described and illustrated, it will be apparent to those skilled in the art that various modifications may be made without departing from the principles of the invention.

What is claimed is:

1. A method for automated custom design of a storage assembly from a remote location connected to the internet comprising:
   defining a storage location at a remote user terminal, wherein the defining is accomplished by drawing the walls of the storage location on a display on the user terminal, and wherein the drawing provides the length of each wall and the relative angles of each wall to the other walls, thereby creating a definition for the storage location;
   providing the definition for the storage location to a centralized computer processing and network server system connected to the internet;
   computing usable space for the storage location based on the definition of the storage location, wherein the usable space satisfies allowance rules based on closet design principles;
   automatically generating a recommended layout for a storage assembly based on the computed usable space, wherein the storage assembly and includes at least one unit is comprised of one or more components;
   displaying the recommended layout for the storage assembly on the remote terminal;
   automatically generating specifications for manufacturing the components of the storage assembly;
   manufacturing the components of the storage assembly based on the specifications; and
   shipping the components of the storage assembly to an address provided by the remote user.

2. The method of claim 1 further comprising:
   displaying at the terminal custom design options selectable by the user for customizing the storage assembly; and
   automatically displaying at the terminal the customized storage assembly and associated pricing information, wherein the pricing information corresponds to custom design options selected by the user for customizing the storage assembly.

3. The method of claim 2 further comprising:
   automatically modifying the recommended layout of the storage assembly, subject to the allowance rules, to maximize fit into the usable space based on the custom design options selected by the user.

4. The method of claim 3, wherein the pricing information includes pricing for the entire storage assembly and for the selected unit within the storage assembly being customized.

5. The method of claim 2, wherein the pricing information further includes electronic transaction information.

6. The method of claim 1 further comprising:
   automatically displaying at the terminal an updated recommended layout for the storage assembly based on a unit modification entered by the user at the terminal, wherein a unit in the updated recommended layout is automatically modified in size based on the unit modification, subject to the allowance rules, to maximize fit into the usable space.

7. The method of claim 1 further comprising:
   displaying at the terminal a menu containing custom design options for a selected unit of the storage assembly; and
   automatically displaying at the terminal the selected unit of the storage assembly as modified by the design options selected by the user.

8. The method of claim 7, wherein the custom design options for the selected unit include custom design options for a section and an item within the section.

9. The method of claim 1, wherein the unit includes at least one section and the section includes at least one item.

10. The method of claim 1 further comprising the step of automatically generating installation instructions for components of the storage assembly.

11. The method of claim 1 wherein the manufacturing facility is linked to the centralized computer processing and network server system and wherein the specifications for the components of the storage assembly is automatically provided to a manufacturing facility.

12. The method of claim 11 wherein the manufacturing facility contains computer controlled equipment for manufacturing the components and the components are automatically manufactured when provided with the specifications.

13. A system for automated custom design of a storage assembly from a remote location comprising:
   a remote user terminal including communications capabilities;
   a central automated custom storage assembly design module having communications capabilities to communicate with the remote user terminal;
   wherein the design module computes usable space for a storage location based on a drawing of the storage location supplied from the remote user terminal over a communications medium, wherein the drawing provides the length of each wall and the relative angles of each wall to the other walls and the computed usable space satisfies allowance rules;
   wherein the design module automatically generates based on the usable space and displays at the user terminal a recommended layout for a storage assembly, wherein the storage assembly includes at least one unit and is comprised of components;
   wherein the design module displays at the terminal custom design options selectable by the user for customizing the storage assembly; and wherein the design module automatically displays at the terminal the customized storage assembly and associated pricing information, wherein the pricing information corresponds to custom design options selected by the user for customizing the storage assembly wherein the design module generates specifications for manufacturing of the components of the customized storage assembly and a purchasing module wherein the purchasing module receive the specifications for the design module and automatically provides for the manufacture of components of the customized storage assembly.

14. The system of claim 13, wherein the design module automatically generates and displays at the user terminal an updated recommended layout based on a unit modification entered by the user at the terminal, wherein a unit in the updated recommended layout is automatically modified in size based on the unit modification, subject to the allowance rules, to maximize fit into the usable space.

15. The system of claim 13, wherein the design module displays at the user terminal a menu containing custom design options for a unit of the storage assembly and automatically displays at the user terminal the selected unit including the custom design options selected by the user.

16. The system of claim 13, wherein the custom design options for the unit include custom design choices for a section and an item within the section.

17. The system of claim 13, wherein the design module automatically modifies the recommended layout for the storage assembly, subject to the allowance rules, to maximize fit into the usable space based on the custom design options selected by the user.

18. The system of claim 13, wherein the pricing information includes pricing for the storage assembly and for the unit within the storage assembly undergoing custom design.

19. The system of claim 13, wherein the pricing information includes electronic transaction information.

20. The system of claim 13, wherein the design module transmits an electronic message link to the user terminal including the recommended layout for the storage assembly, a predetermined number of selectable design choices for modifying at least one unit of the recommended layout and purchasing and electronic transaction information.

21. The system of claim 13, wherein the unit includes at least one section and the section includes at least one item.

* * * * *